Figure 1:

C. W. SCHAEFER.
TORTOISE-SHELL HANDLE.

No. 191,615. Patented June 5, 1877.

WITNESSES:
Chas. Nida
J. H. Scarborough

INVENTOR:
C. W. Schaefer
BY
ATTORNEYS.

UNITED STATES PATENT OFFICE.

CHRISTIAN W. SCHAEFER, OF NEW YORK, N. Y.

IMPROVEMENT IN TORTOISE-SHELL HANDLES.

Specification forming part of Letters Patent No. 191,615, dated June 5, 1877; application filed April 16, 1877.

*To all whom it may concern:*

Be it known that I, CHRISTIAN W. SCHAEFER, of the city, county, and State of New York, have invented a new and useful Improvement in Manufacturing Tortoise-Shell Handles, of which the following is a specification:

The object of this invention is to mount the handles of canes, umbrellas, parasols, whips, opera-glasses, and similar articles, with a tortoise-shell covering, in such a manner that the present inefficient mode of attaching the same by glue may be dispensed with, the covering attached in tightly-fitting and durable manner, and the joint or weld of the edges be not noticeable in the least.

The invention will first be described in connection with the drawing, and then pointed out in the claim.

Figure 3:
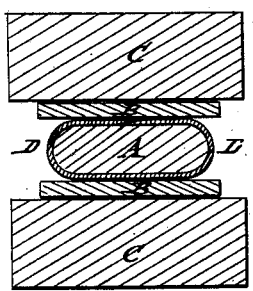
Figure 4:
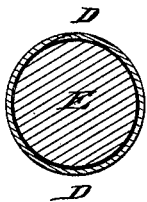
Figure 2:

In the accompanying drawing, Figures 1 and 2 are, respectively, a side view of a handle and a section of a tortoise-shell covering to be placed thereon. Fig. 3 is a cross-section of the covering, showing the act of uniting or welding the joint; and Fig. 4 is a vertical transverse section of the finished handle.

Similar letters of reference indicate corresponding parts.

In my method of applying tortoise-shell coverings to handles of all kinds, I have two main points in view, first, to produce a joint of such intimate nature that the seam or weld of the edges cannot be discovered afterward; and, secondly, in mounting the covering after the edges are jointed, in such a manner that an intimate fitting of the covering to the handle is obtained, while at the same time such rigidity is imparted to the covering that it will not split or spring off, but resist effectually wear, changes of temperature, and other external influences to which the same is exposed.

The first result is obtained by cutting a blank of tortoise-shell of the size and thickness required for the article to be covered, beveling off the edges, and lapping the same around a flat wooden core, A, with rounded-off edges, as shown in Fig. 3. The jointed edges are then placed between wooden strips B, that are provided, as well as the core, with a certain degree of moisture, and exposed to the pressure and heat of hot metallic plates C. The joint remains exposed to the moist heat and pressure of the wood for a certain time, according to the thickness of the blank, until the edges are thoroughly united or welded, they showing then no visible signs of connection. The blank D is then taken from the core and chilled by being placed into cold water. The flattened shape of the chilled covering is then changed by placing the same into warm water, to which salt or soda has been added. The warm water softens the covering so as to render it pliable, while the salt or soda imparts stiffness and rigidity to the same when dry. The covering D is then mounted in its soft state on the handle or other article E, fitting snugly thereto when dry, and having sufficient strength to resist any outside influence without cracking, splitting, or deteriorating, so as to form a neat and durable covering for handles and other articles of all kinds.

I am aware that it is not new to unite corneous substances by heat and pressure; but

What I claim is—

The method, consisting of the following consecutive steps, of applying tortoise-shell to handles: first, by uniting the edges by exposure to moisture, heat, and pressure; second, softening the shell in warm water; third, chilling the same; fourth, immersing the same in a bath of soda or salt; and, fifth, mounting on cores or molds.

CHRISTIAN W. SCHAEFER.

Witnesses:
PAUL GOEPEL,
C. SEDGWICK.